(12) United States Patent
Chen

(10) Patent No.: US 10,656,099 B2
(45) Date of Patent: May 19, 2020

(54) MONITORING METHOD AND MONITORING APPARATUS OF THIMBLE BASES

(71) Applicant: Wuhan China Star Optoelectronics Semiconductor Display Technology Co., Ltd., Wuhan, Hubei (CN)

(72) Inventor: Ping Chen, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 35 days.

(21) Appl. No.: 15/744,716

(22) PCT Filed: Nov. 30, 2017

(86) PCT No.: PCT/CN2017/114006
§ 371 (c)(1),
(2) Date: Oct. 25, 2018

(87) PCT Pub. No.: WO2019/104661
PCT Pub. Date: Jun. 6, 2019

(65) Prior Publication Data
US 2019/0162677 A1 May 30, 2019

(30) Foreign Application Priority Data
Nov. 30, 2017 (CN) .......................... 201711215459.3

(51) Int. Cl.
*G01N 21/956* (2006.01)
*G02F 1/13* (2006.01)
*G01N 21/95* (2006.01)

(52) U.S. Cl.
CPC ....... *G01N 21/95684* (2013.01); *G01N 21/95* (2013.01); *G01N 2021/9513* (2013.01); *G02F 1/1303* (2013.01)

(58) Field of Classification Search
CPC ............ G01N 21/95; G01N 21/95684; G01N 2021/9513; G02F 1/1303
See application file for complete search history.

(56) References Cited

U.S. PATENT DOCUMENTS

2002/0036617 A1* 3/2002 Pryor ...................... G06F 3/042
345/156
2006/0267927 A1* 11/2006 Crenshaw ............. G06F 1/1626
345/156

(Continued)

FOREIGN PATENT DOCUMENTS

CN 101047141 A 10/2007
CN 105738383 A 7/2016

(Continued)

*Primary Examiner* — Sang H Nguyen
(74) *Attorney, Agent, or Firm* — Hemisphere Law, PLLC

(57) ABSTRACT

A monitoring method of a thimble base includes the following steps: arranging a reflective surface on a thimble head of a thimble base; arranging at least a light source and a receiver on the thimble base; establishing a reflection path between the thimble bases to project light onto the reflective surface of the thimble head of one of the thimble bases in the reflection path, so that light is reflected between the reflective surfaces and is finally reflected to the receiver. The disclosure also provides a monitoring apparatus of the thimble bases. The monitoring apparatus includes a carrying platform, thimble bases arranged in an array on the carrying platform, and at least one light projecting and receiving device. Compared with the prior art, the disclosure realizes real-time monitoring of the thimble bases, thereby avoiding the problem of fragmentation caused by deformation of the thimble bases.

16 Claims, 3 Drawing Sheets

(56) References Cited

U.S. PATENT DOCUMENTS

2014/0292636 A1* 10/2014 Rosener ............... G06F 3/0304
                                                        345/156
2017/0084475 A1    3/2017 Wagner et al.

FOREIGN PATENT DOCUMENTS

| CN | 205529022 U | 8/2016 |
| CN | 206271678 U | 6/2017 |

* cited by examiner

MONITORING METHOD AND MONITORING APPARATUS OF THIMBLE BASES

RELATED APPLICATIONS

The present application is a National Phase of International Application Number PCT/CN2017/114006, filed Nov. 30, 2017, and claims the priority of China Application No. 201711215459.3, filed Nov. 28, 2017.

FIELD OF THE DISCLOSURE

The disclosure relates to a display panel manufacturing technology, in particular to a monitoring method and a monitoring apparatus of thimble bases.

BACKGROUND

For LCD panels, semiconductors and other industries, fragmentation is a matter of special concern. In the exposure equipment, the thimble base in the baking machine may be bent or height changes and cause the problem of fragmentation, but engineers can not monitor the state of the thimble bases in real time, and can only check the state of the thimble bases at the time of the monthly or quarterly check, which makes engineers facing the risk of fragmentation caused by the thimble bases in the production process. And with the growing size of the LCD panel industry, the size of the equipment also increases, which makes engineers more difficult to monitor the state of the thimble bases, and therefore, how to monitor the thimble bases is an urgent problem to be solved in industry.

SUMMARY

In order to overcome the deficiencies of the prior art, the disclosure provides a monitoring method and a monitoring apparatus of the thimble bases, so that the thimble bases can be monitored in real time.

The disclosure provides a monitoring method of the thimble bases, including the following steps:

arranging a reflective surface on a thimble head of the thimble base;

arranging at least a light source and a receiver for the thimble bases;

establishing a reflection path between the thimble bases to project light onto the reflective surface of the thimble head of one of the thimble bases in the reflection path, so that light is reflected between each of the reflective surfaces and finally reflected to the receiver to determine whether the thimble bases are deformed.

Further, determining whether the thimble bases are deformed includes determining whether a parameter of a reflected light received by the receiver is the same as a set value; when the parameter of the reflected light is not equal to the set value, a deformation of the thimble base is identified.

Further, alarming when a deformation of the thimble base is identified.

Further, the parameter of the reflected light includes a light intensity.

The disclosure also provides a monitoring apparatus includes a carrying platform, the thimble bases arranged in an array on the carrying platform applied to support the substrate, and at least one light projecting and receiving device;

a reflective surface is arranged on a peripheral wall of a thimble head of the thimble base;

the light projecting and receiving device includes a light source applied to project light toward one of the thimble bases and a light emitted by a light source of the light projecting and receiving device is projected to the reflective surface of one of the thimble bases and is reflected between the reflective surfaces of the thimble bases and is finally reflected to the receiver.

Further, the receiver is further configured to determine whether a parameter of the reflected light received by the receiver is the same as a set value or whether the reflected light is received.

Further, the monitoring apparatus further includes an alarming device, and the alarming device is applied to alarm when the parameter of the reflected light received by the receiver is different from the set value or the reflected light is not received.

Further, each light projecting and receiving device corresponds to the thimble bases having a same height in the thimble bases.

Further, a projection direction of the light source in each light projecting and receiving device is respectively opposite to the reflective surface of one of the thimble bases having the same height in the thimble bases, and the receiver in each light projecting and receiving device is located in the thimble bases having the same height and is opposite to the reflective surface that last receives the reflected light.

Further, the parameter of the reflected light includes a light intensity.

Compared with the prior art, the disclosure determines whether the thimble bases are deformed (in morphological change) by arranging a reflective surface on the thimble head of the thimble base and projecting light by the light source to the reflective surface to receive the reflected light, so as to realize the real-time monitoring of the thimble bases, thereby avoiding the problem of fragmentation caused by the deformation of the thimble bases.

DETAILED DESCRIPTION OF PREFERRED EMBODIMENTS

In the disclosure, the monitoring method and the monitoring apparatus of the thimble bases are used in the carrying platform for carrying the substrate in the oven of the exposure machine.

The disclosure will be further described in detail below with reference to the accompanying drawings and embodiments.

Figure 2:
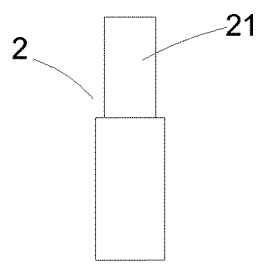
FIG. 2 is a schematic diagram of a mechanism of thimble base of the disclosure.
Figure 3:
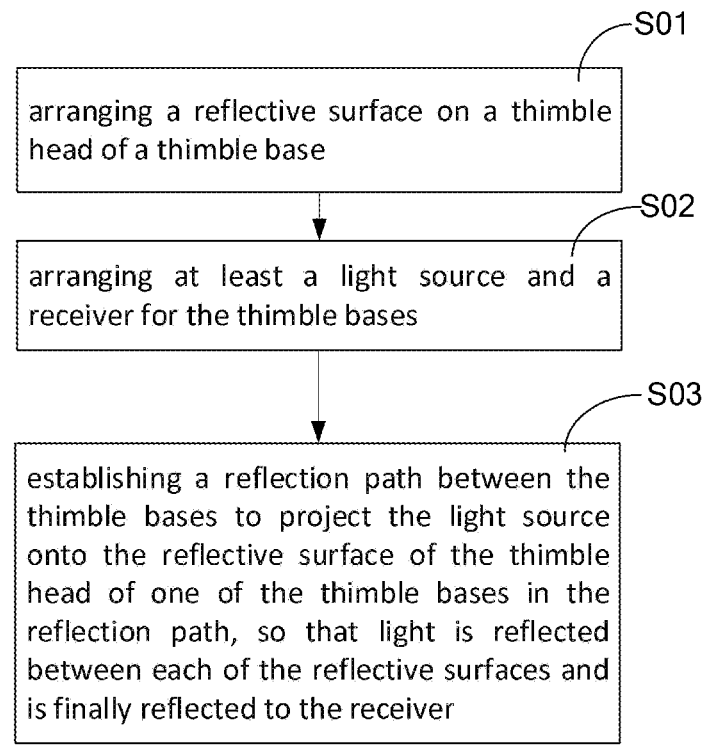
FIG. 3 is a flow chart of a monitoring method of the disclosure.

As shown in FIG. 3, the disclosure discloses a monitoring method of the thimble bases, including the following steps:

S01: arranging a reflective surface 21 on a thimble head of the thimble base 2 (as shown in FIG. 2). Specifically, the reflective surface 21 may be configured as one or two surfaces of the thimble head having a plurality of surfaces, and a polyhedron herein may be a trihedron or a tetrahedron, etc.; the reflective surface 21 of the thimble head of each of the thimble bases 2 participates in at least one reflection, that is, irrespective of the reflection path, it is only necessary to ensure that light is reflected by the reflective surface 21 of each of the thimble bases 2 at least once; the specific arrangement can be performed according to actual needs, which is not limited herein.

S02: arranging at least one light source 31 and a receiver 32 on the thimble bases 2; and the light source 31 and the receiver 32 may be a laser light source and a laser receiver.

Figure 4:
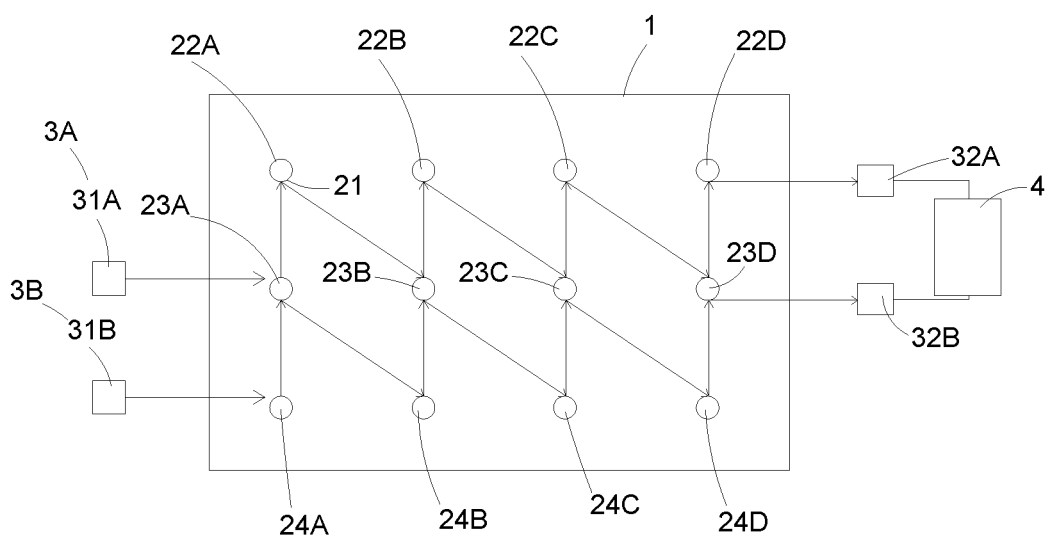
FIG. 4 is a schematic diagram of a reflection principle of the disclosure.

S03: establishing a reflection path between the thimble bases 2 to project the light source 31 onto the reflective surface 21 of the thimble head of one of the thimble bases 2 in the reflection path, so that light is reflected between each of the reflective surfaces 21 and is finally reflected to the receiver 32 to determine whether the thimble bases 2 are deformed. Specifically, the step can be carried out according to the arrangement rule of the thimble bases 2 on the carrying platform 1; under normal circumstances, the thimble bases 2 are arranged in an array, that is, the thimble bases have N rows and M columns, and N and M are positive integers greater than 1; the arrangement of the light source 31 is made in the number of N-1 or M-1; when adopting the number of N-1 to make the arrangement, the light source 31 is arranged in the row direction and is opposite to the first one of the thimble bases 2, while the receiver 32 is arranged on the last one of the thimble bases 2 in the column adjacent to the light source 31 (as shown in FIG. 4). As can be seen in FIG. 4, since the number of the light sources 31 is always less than the number of rows of the thimble bases 2, one row of the light sources 31 is not arranged and only reflections are involved; when adopting the number of M-1 rows to make the arrangement, the principle is the same as that for arrangement of the number of N-1, which will not be described herein. However, the disclosure is not limited thereto, and a plurality of groups may also be divided according to different heights of the thimble bases 2 in the carrying platform 1, and the heights of the thimble bases 2 in each group are the same, a set of light source 31 and receiver 32 may be correspondingly arranged in each group, or multiple sets thereof may be arranged in each group, which are not specifically limited herein.

In the disclosure, the reflective surface 21 is arranged according to the desired reflection path of the light, and the specific arrangement is not limited herein.

In step S03, determining whether the thimble bases are deformed includes determining whether a parameter of a reflected light received by the receiver is the same as the set value; when the parameter of the reflected light is not equal to the set value, a deformation of the thimble base is identified. Since the thimble bases produces different levels of deformation in practical applications, so determining the parameters of the reflected light and whether the reflected light can be received. And the parameter of the reflected light includes a light intensity.

In the disclosure, the deformation, namely the change of the shape, is specifically that the thimble head of the thimble base bends or collapses or the like.

In step S03, alarming when a deformation of the thimble bases is identified, and the alarming may be sound and/or light alarm. The way of alarming can be audible and/or light alarm.

Figure 1:
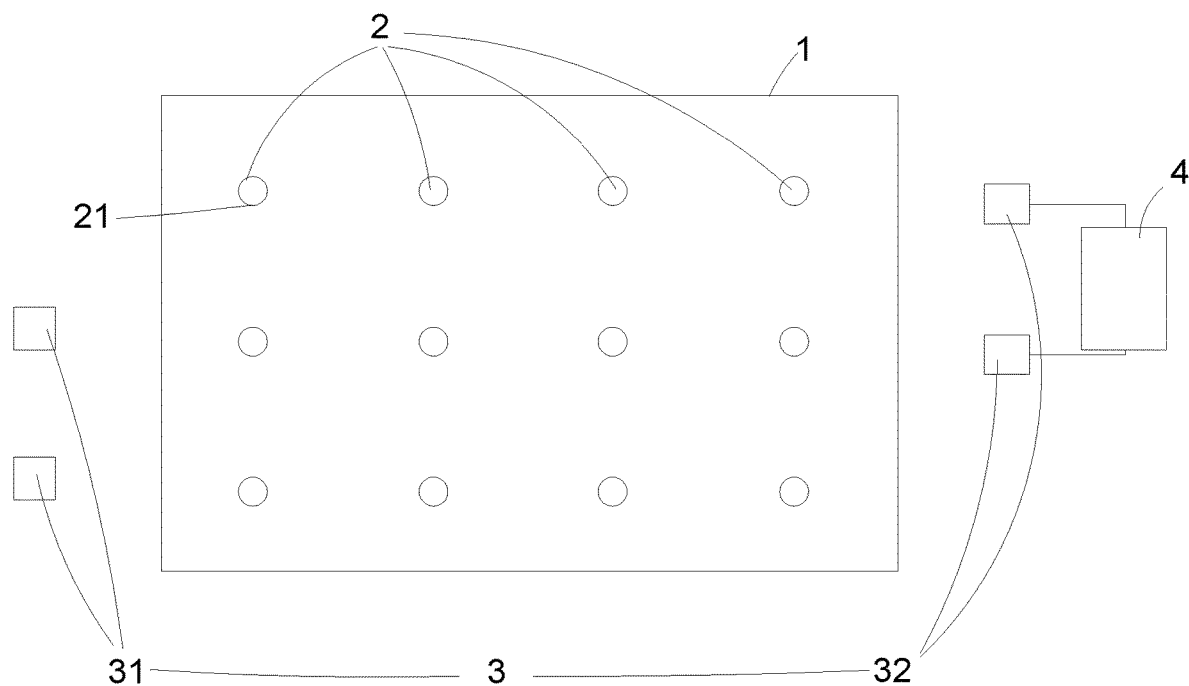
FIG. 1 is a schematic structural view of the disclosure.

As shown in FIG. 1, which is a monitoring apparatus of the thimble bases of the disclosure, the monitoring apparatus includes a carrying platform 1, thimble bases 2 arranged in an array on the carrying platform 1 applied to support the substrate, and at least one light projecting and receiving device 3.

a reflective surface 21 is arranged on a peripheral wall of a thimble head of the thimble base 2 (as shown in FIG. 2); the reflective surface 21 is a smooth surface; the reflective surface 21 is involved in at least one light reflection; The reflective surface 21 may be formed by one or two surfaces of a thimble head having a polyhedron, which is not limited herein.

In the disclosure, all of the thimble bases 2 on the carrying platform 1 can be set in one reflection path, and a plurality of reflection paths can also be constituted.

The light projecting and receiving device 3 includes a light source 31 applied to project light toward one of the thimble bases 2 and a receiver 32 applied to receive the reflected light reflected by the reflective surface 21, and the light emitted by the light source 31 of the light projecting and receiving device is projected to the reflective surface 21 of one of the thimble bases 2, and is reflected between the reflective surfaces 21 of the thimble bases 2 and is finally reflected to the receiver 32.

The receiver 32 is further configured to determine whether a parameter of the reflected light received by the receiver is the same as a set value or whether the reflected light is received; the parameter of the reflected light includes a light intensity.

The monitoring apparatus further includes an alarming device 4, and the alarming device 4 is applied to alarm when the parameter of the reflected light received by the receiver 32 is different from the set value or the reflected light is not received.

In the disclosure, the thimble bases 2 may be arranged in an array or in a conventional arrangement, Under normal circumstances, the thimble bases 2 are arranged in an array, that is, with N rows and M columns, the arrangement of the light source 31 is made in the number of N-1 or M-1; when adopting the number of N-1 to make the arrangement, the light source 31 is arranged in the row direction and is opposite to the first one of the thimble bases 2, while the receiver 32 is arranged on the last one of the thimble bases 2 in the column adjacent to the light source 31 (as shown in FIG. 4). As can be seen in FIG. 4, since the number of the light sources 31 is always less than the number of rows of the thimble bases 2, one row of the light sources 31 is not arranged and only reflections are involved; when adopting the number of M-1 rows to make settings, the principle is the same as that for setting the number of N-1, which will not be repeated here; however, the disclosure is not limited thereto, and a plurality of groups may also be divided according to different heights of the thimble bases 2 in the carrying platform 1, and the heights of the thimble bases 2 in each group are the same, a set of light source 31 and receiver 32 may be correspondingly arranged in each group, or multiple sets thereof may be arranged in each group, the height of the thimble bases 2 in each group of the thimble bases 2 or in each row or column can be set to be different, so that the reflection can be performed between the thimble bases 2 having the different heights.

In the disclosure, it is only necessary to ensure that light can be reflected between the reflective surfaces and finally be reflected to the receiver. The setting of the reflection path can be designed according to actual needs, which is not limited herein.

In the light projecting and receiving device 3 of the disclosure, the light source 31 and the reflective surface 21 of the thimble base 2 receiving the initial light are arranged at the same height, and the receiver 32 and the reflective surface 21 of the thimble base 2 reflecting light to the receiver 32 are arranged at the same height.

As an embodiment of the disclosure, each light projecting and receiving device 3 corresponds to the thimble bases 2 having a same height in the thimble bases 2. The projecting direction of the light source 32 in each light projecting and receiving device 3 is respectively opposite to the reflective surface 21 of one of the thimble bases 21 having the same height, the receiver 21 in each light projecting and receiving device 3 located in the thimble base 2 at the same height is opposite to the reflective surface 21 receiving the last reflected light.

The general idea of the disclosure will now be described in detail with reference to FIG. 4. Assuming that the carrying platform 1 is disposed with three rows and four columns of thimble bases 2. Hereinafter, for the convenience of description, the thimble bases 2 of the first row are defined in the order of 22A, B, . . . , the thimble bases 2 of the second row are defined in the order of 23A, 23B, . . . , and the thimble bases 2 of the third row are defined in the order of 24A, 24B, . . . ; and the light projecting and receiving device 3 is provided with two sets, the first set is 3A, the second set is 3B, the thimble bases of the first and second rows constitute the first reflection path, and the thimble bases of the second and third rows constitute the second reflection path.

The light source 31A of the first light projecting and receiving device 3A is arranged in the thimble bases of the second row and at a position opposite to the first thimble base 23A, and the receiver 32A is arranged in the thimble bases of the first row adjacent to the second row and at a position opposite to the last thimble base 22D; and the light source 31B of the second light projecting and receiving device 3B is arranged in the thimble bases of the third row and at a position opposite to the first thimble base 24A, and the receiver 32B is arranged in the thimble bases of the second row adjacent to the third row and at a position opposite to the last thimble base 23D; of course, the arrangement thereof can also be made in other ways.

With this arrangement, the light projected from the light source 31A of the first light projecting and receiving device 3A is reflected between the thimble bases of the first row and the second row, Here, the reflection path is toothed. Specifically, the light is finally reflected to the receiver 32A of the first light projecting and receiving device 3A through the thimble base 23A, the thimble base 22A, the thimble base 23B, the thimble base 22B, the thimble base 23C, the thimble base 22C, the thimble base 23D, and the thimble base 22D; the light projected from the light source 31B of the second light projecting and receiving device 3B is reflected between the thimble bases of the second row and the third row, and the reflection path thereof is also toothed, Specifically, the light is finally reflected to the receiver 32B of the second light projecting and receiving device 3B through the thimble base 24A, the thimble base 23A, the thimble base 24B, the thimble base 23B, the thimble base 24C, the thimble base 23C, the thimble base 24D, and the thimble base 3D. It can be seen here that in the array arrangement of the thimble bases, only the two rows of the thimble bases arranged on the outermost side are involved in one reflection, and the other rows of the thimble bases are involved in two reflections.

According to this principle, the reflective surface 21 is arranged to ensure that the reflection of light passes through each of the thimble bases on the path, so as to ensure the complete reflection path.

Of course, the height of the thimble bases for each row or each column in the disclosure may be different, and when the height is different, the reflective surface 21 is a cambered surface, and the cambered surface may be convex or concave.

Figure 5:
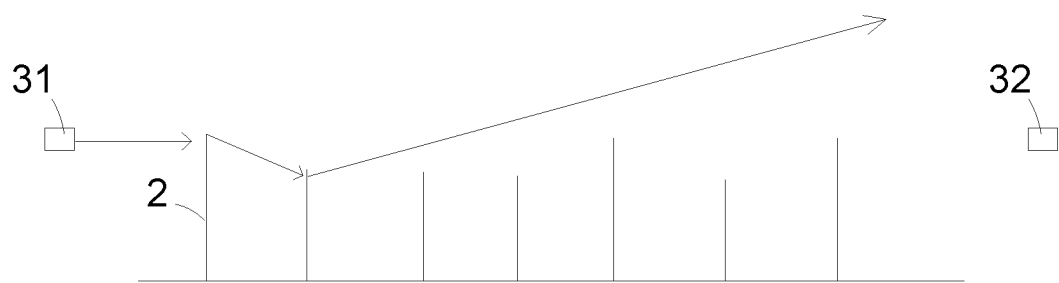
FIG. 5 is a schematic diagram of a light reflection in monitoring according to the disclosure.

As shown in FIG. 5, when one or two of the thimble bases 2 in one reflection path is deformed, the reflection path can not be completely reflected into the receiver. When the receiver receives the reflected light parameters or receives no reflected light, then an alarm will be sent.

In the disclosure, the principle of light reflection can be used to detect the morphological changes of the thimble base in time, so as to effectively prevent the fragmenting problem caused by the change of the shape of the thimble base.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A monitoring method of thimble bases, comprising the following steps:
    arranging a reflective surface on a thimble head of the thimble base;
    arranging at least a light source and a receiver for the thimble bases; and
    establishing a reflection path between the thimble bases to project the light source onto the reflective surface of the thimble head of one of the thimble bases in the reflection path, so that light is reflected between each of the reflective surfaces and is finally reflected to the receiver to determine whether the thimble bases are deformed.

2. The monitoring method of the thimble bases according to claim 1, wherein determining whether the thimble bases are deformed comprises determining whether a parameter of a reflected light received by the receiver is the same as the set value; when the parameter of the reflected light is not equal to the set value, a deformation of the thimble bases is identified.

3. The monitoring method of the thimble bases according to claim 2, wherein alarming when a deformation of the thimble base is identified.

4. The monitoring method of the thimble bases according to claim 2, wherein the parameter of the reflected light comprises a light intensity.

5. The monitoring method of the thimble bases according to claim 1, wherein determining whether the thimble bases are deformed comprises determining whether the reflected light is received by the receiver, when the reflected light is not received by the receiver, a deformation of the thimble bases is identified.

6. The monitoring method of the thimble bases according to claim 5, wherein alarming when a deformation of the thimble bases is identified.

7. A monitoring apparatus of thimble bases, comprising:
    a carrying platform,
    thimble bases arranged in an array on a carrying platform applied to support a substrate, and
    at least one light projecting and receiving device;
    wherein a reflective surface is arranged on a peripheral wall of the thimble head of the thimble base;
    wherein the light projecting and receiving device comprises a light source applied to project light toward one of the thimble bases and a receiver applied to receive a reflected light reflected by the reflective surface, and a light emitted by the light source of the light projecting and receiving device is projected to the reflective surface of one of the thimble bases and is reflected between the reflective surfaces of the thimble bases and is finally reflected to the receiver.

8. The monitoring apparatus of the thimble bases according to claim 7, wherein the receiver is further configured to determine whether a parameter of the reflected light received by the receiver is the same as a set value or whether the reflected light is received.

9. The monitoring apparatus of the thimble bases according to claim 8, wherein the monitoring apparatus further comprises an alarming device, and the alarming device is applied to alarm when the parameter of the reflected light received by the receiver is different from the set value or the reflected light is not received.

10. The monitoring apparatus of the thimble bases according to claim 9, wherein each light projecting and receiving device corresponds to the thimble bases having a same height in the thimble bases.

11. The monitoring apparatus of the thimble base according to claim 10, wherein a projection direction of the light source in each light projecting and receiving device is respectively opposite to the reflective surface of one of the thimble bases having the same height in the thimble bases, and the receiver in each light projecting and receiving device is located in the thimble bases having the same height and is opposite to the reflective surface that last receives the reflected light.

12. The monitoring apparatus of the thimble bases according to claim 8, wherein each light projecting and receiving device corresponds to the thimble bases having a same height in the thimble bases.

13. The monitoring apparatus of the thimble base according to claim 12, wherein a projection direction of the light source in each light projecting and receiving device is respectively opposite to the reflective surface of one of the thimble bases having the same height in the thimble bases, and the receiver in each light projecting and receiving device is located in the thimble bases having the same height and is opposite to the reflective surface that last receives the reflected light.

14. The monitoring apparatus of the thimble bases according to claim 7, wherein each light projecting and receiving device corresponds to the thimble bases having a same height in the thimble bases.

15. The monitoring apparatus of the thimble bases according to claim 14, wherein a projection direction of the light source in each light projecting and receiving device is respectively opposite to the reflective surface of one of the thimble bases having the same height in the thimble bases, and the receiver in each light projecting and receiving device is located in the thimble bases having the same height and is opposite to the reflective surface that last receives the reflected light.

16. The monitoring apparatus of the thimble base according to claim 8, wherein the parameter of the reflected light comprises a light intensity.

* * * * *